(12) United States Patent
Schmit

(10) Patent No.: US 9,998,878 B2
(45) Date of Patent: Jun. 12, 2018

(54) SYSTEMS AND METHODS FOR ENABLING SHARING BETWEEN DEVICES

(71) Applicant: AT&T Mobility II LLC, Atlanta, GA (US)

(72) Inventor: Edward G. Schmit, Seattle, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 132 days.

(21) Appl. No.: 14/931,480

(22) Filed: Nov. 3, 2015

(65) Prior Publication Data
US 2017/0127455 A1 May 4, 2017

(51) Int. Cl.
*H04W 4/06* (2009.01)

(52) U.S. Cl.
CPC .................................... *H04W 4/06* (2013.01)

(58) Field of Classification Search
CPC ... H04W 76/02; H04W 84/12; H04W 76/023; H04W 76/021; H04W 76/025; H04W 88/04; H04W 8/22; H04W 76/002; H04W 4/003; H04W 4/06
See application file for complete search history.

(56) References Cited

U.S. PATENT DOCUMENTS

| | | |
|---|---|---|
| 7,344,084 B2 | 3/2008 | DaCosta |
| 7,518,503 B2 | 4/2009 | Peele |
| 7,624,417 B2 | 11/2009 | Dua |
| 7,712,125 B2 | 5/2010 | Herigstad et al. |
| 8,209,424 B2 | 6/2012 | Klappert |
| 8,316,400 B1 * | 11/2012 | Kravets ............... H04L 63/0807 713/185 |
| 8,453,185 B2 | 5/2013 | Bonfrer |
| 8,468,567 B2 | 6/2013 | Craib et al. |
| 8,589,986 B2 | 11/2013 | McCoy et al. |
| 8,595,319 B2 | 11/2013 | Hao et al. |
| 8,627,399 B2 | 1/2014 | White et al. |
| 8,650,600 B2 | 2/2014 | Ogle et al. |
| 8,683,527 B2 | 3/2014 | Pratt et al. |
| 8,689,274 B2 | 4/2014 | Li et al. |
| 8,832,750 B2 | 9/2014 | Chen et al. |
| 8,918,822 B2 | 12/2014 | Varoglu et al. |
| 8,978,066 B2 | 3/2015 | Hao et al. |

(Continued)

FOREIGN PATENT DOCUMENTS

| | | |
|---|---|---|
| EP | 1949686 | 11/2007 |
| WO | 03087961 A1 | 10/2003 |

OTHER PUBLICATIONS

"Free HD TV Wherever You Are", Simple.TV, webarchieve.org, May 27, 2014, https://web.archive.org/web/20140527142254/https://us.simple.tv/, 7 pages.

(Continued)

*Primary Examiner* — Magdi Elhag
(74) *Attorney, Agent, or Firm* — Toler Law Group, PC

(57) ABSTRACT

A method includes sending a message to a mobile device via a first network, the message including set-up information related to a communication session. The method may further include establishing a wireless peer-to-peer communication session with the mobile device via a second network in response to a selection of a selectable link at the mobile device, the selectable link based on the set-up information.

20 Claims, 6 Drawing Sheets

(56) References Cited

U.S. PATENT DOCUMENTS

| | | | |
|---|---|---|---|
| 9,847,904 B2* | 12/2017 | Rajapakse | H04L 65/4069 |
| 2007/0089145 A1 | 4/2007 | Medford et al. | |
| 2008/0229375 A1 | 9/2008 | Roberts et al. | |
| 2008/0244657 A1 | 10/2008 | Arsenault et al. | |
| 2008/0244660 A1 | 10/2008 | Wodka et al. | |
| 2010/0146560 A1* | 6/2010 | Bonfrer | H04N 21/43637 |
| | | | 725/62 |
| 2010/0197289 A1* | 8/2010 | Lee | G06F 9/445 |
| | | | 455/418 |
| 2012/0017249 A1 | 1/2012 | Ozawa | |
| 2012/0209916 A1 | 8/2012 | Azuma et al. | |
| 2013/0040626 A1* | 2/2013 | Morgaine | H04W 4/00 |
| | | | 455/418 |
| 2014/0013357 A1 | 1/2014 | Urban et al. | |
| 2014/0259081 A1 | 9/2014 | Chatterjee | |
| 2015/0082361 A1 | 3/2015 | Ortiz et al. | |
| 2016/0197987 A1* | 7/2016 | Lee | H04W 4/003 |
| | | | 709/204 |

OTHER PUBLICATIONS

"How Tablo Works", Tablo™, webarchieve.com, Dec 11, 2013, https://web.archive.org/web/20131211003731/http://www.tablotv.com/how-tablo-works/, 5 pages.

"QuickPlay Announces Mobile Set-Top Box Solution for TV Service Providers", Quickplay™, quickplay.com, Aug. 24, 2009, http://www.quickplay.com/quickplay-announces-mobile-set-top-box-solution-for-tv-serviceproviders, 3 pages.

"Slingbox 500", Slingbox, webarchieve.com, Sep. 8, 2015, https://web.archive.org/web/20150908044421/http://www.slingbox.com/Products/Slingbox500/Features.aspx, 4 pages.

* cited by examiner

SYSTEMS AND METHODS FOR ENABLING SHARING BETWEEN DEVICES

FIELD OF THE DISCLOSURE

The present disclosure is generally related to enabling sharing between devices.

BACKGROUND

As mobile devices have become more common and more powerful, new methods of using such mobile devices have developed. In particular, new methods of sharing content, such as media content applications and so forth, have arisen in which a mobile device is able to share its screen to a media device. Such methods are often referred to as screen mirroring. Screen mirroring enables a mobile device, such as a mobile phone, to direct a media device to a source of content to generate a display so that, for example, media displayed by the mobile device is displayed at a display that is associated with a media device, such as a television.

For various reasons, such as improved security, branding, and access control, content providers may provide applications that enable access to their content. For example, a television content provider may provide a media device that executes a media access application that is configured to access content from the television content provider. Such media devices that execute applications to access content may also be able to execute applications for other functions, such as communications (e.g., video conferencing and games). Since content provider networks associated with media devices are often secured, applications that are executable by the media device may be limited to those approved or provided via the content provider. Additionally, content catalogs associated with content providers as well as public content catalogs such as Google Play catalog or the iTunes application catalog have a large selection of applications (Google Play is a registered trademark of Google Inc. of Mountain View, Calif., and iTunes is a registered trademark of Apple Inc. of Cupertino, Calif.). Accordingly, it may be difficult for a user to find a specific application via an open content catalog that corresponds to or is useable with a specific content provider's media device.

DETAILED DESCRIPTION

Figure 1:
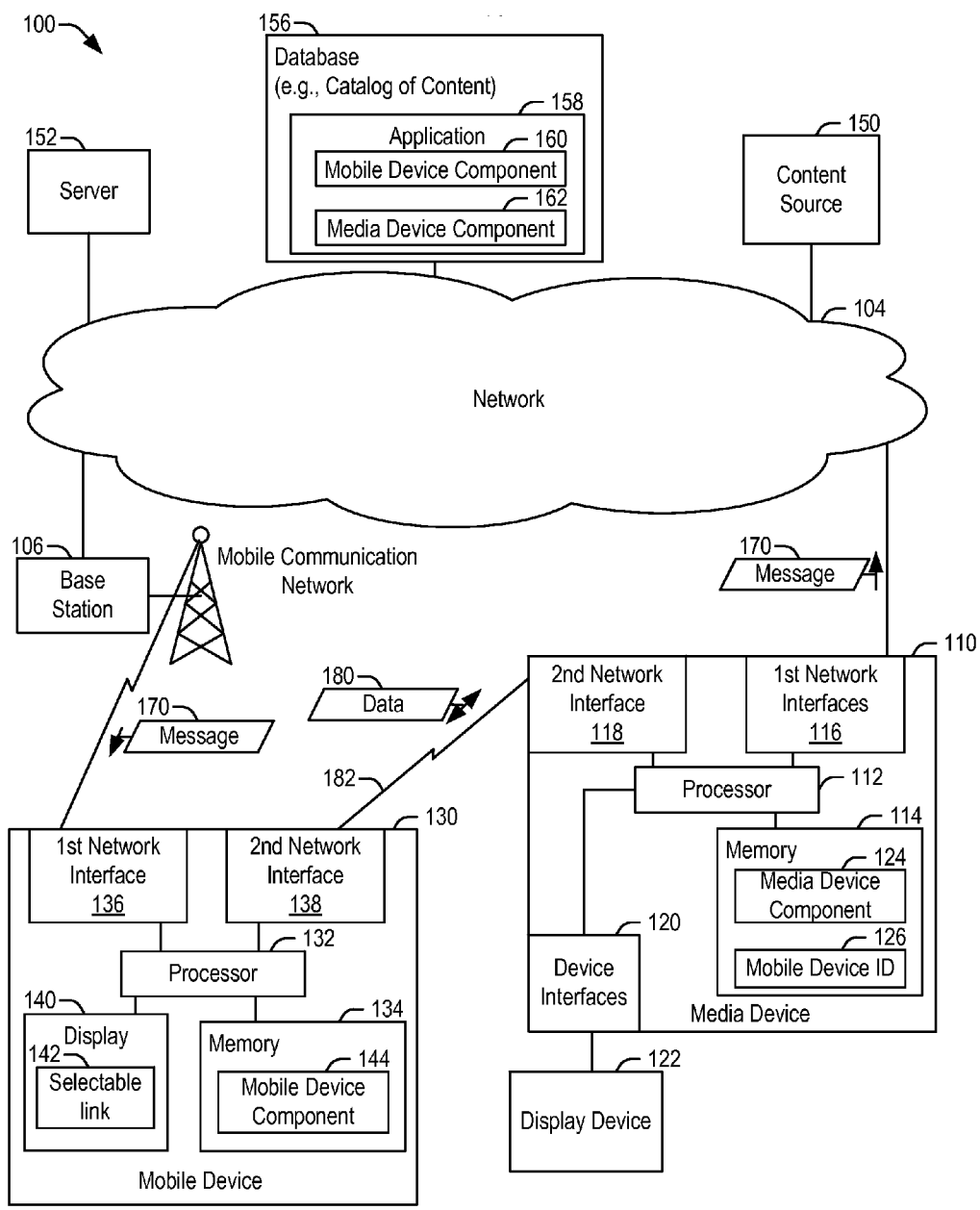
FIG. 1 is a diagram of a particular example of a system for enabling sharing between devices.

Systems and methods are disclosed that enable a media device to initiate a communication session with a mobile device to enable sharing of data between the media device and the mobile device so that the mobile device may be able to readily identify an application associated with the media device. For example, a media device may have access directly to a content provider network (e.g., a secured network associated with a content provider), and the content provider network may provide a database that has a listing of content that is available to the media device. The catalog of content may include or identify applications that are executable by the media device as well as applications that are executable by mobile devices in conjunction with an application of the media device. For example, a particular application may be associated with a mobile device component and a media device component. When the application is executed at the media device and a corresponding mobile device, data may be shared between the media device and the mobile device to enable new functionality. Thus, in contrast to screen mirroring, where a mobile device causes a media device to display content, the disclosed embodiments may enable a media device to initiate contact with the mobile device to share content, establish an interactive communication session, and so forth.

In a particular embodiment, a media device includes a processor and a memory accessible to the processor. The memory stores instructions that are executable by the processor to perform operations. The operations may include causing a message to be sent to a mobile device. The message may include set-up information related to a communication session. The operations may further include establishing a wireless peer-to-peer communication session with the mobile device in response to a selection of a selectable link at the mobile device. The selectable link may be based on the set-up information.

In a particular embodiment, a mobile device includes a processor and a memory accessible to the processor. The memory stores instructions that are executable by the processor to perform operations. The operations may include receiving a message including set-up information related to a session with a media device. The operations may further include generating a display including a selectable link associated with the set-up information. The operations may further include establishing a wireless-peer-to-peer communication session with the media device in response to a selection of the selectable link.

In a particular embodiment, a method includes sending a message to a mobile device via a first network. The message may include set-up information related to a communication session. The method may further include establishing a wireless peer-to-peer communication session with the mobile device via a second network in response to a selection of a selectable link at the mobile device, the selectable link based on the set-up information.

FIG. 1 illustrates a particular example of a system 100 to enable sharing data between a media device 110 and a mobile device 130. The media device 110 may include a set top box, a residential gateway, or another media device that is configured to be coupled to a display device 122 to generate media output for consumption by a user. The media device 110 may include a plurality of interfaces such as a first network interface 116 configured to communicate via a first network 104. The first network 104 may include the Internet, as well as one or more wireless wide area networks (WWANs), such as a mobile communication network.

In addition, the media device 110 may include a second network interface 118 that is configured to communicate via a local area network (LAN) such as a wireless LAN (WLAN). The media device 110 may also include a processor 112 and a memory 114. The processor 112 may be configured to execute one or more applications stored at the memory 114. Additionally, the processor 112 may be configured to process media content received via the first network 104 to provide media output to the display device 122 and/or other components not shown. The media device 110 may include the display device 122, or the media device 110 may include a device interface 120 configured to couple to the display device 122. In the particular example illustrated in FIG. 1, the media device 110 may communicate via an access network (not shown) or a secure tunnel through the first network 104 to a content source 150. The content source 150 may include a server associated with a content provider, such as a television provider, an on-demand media provider, an Internet protocol television service provider, or another service provider.

The mobile device 130 may include a processor 132 and a memory 134. The processor 132 may be configured to execute instructions stored in the memory 134 to perform various functions. For example, the mobile device 130 may include or correspond to a mobile telephony device, such as a smart phone. In this example, the processor 132 may be configured to execute an operating system (not shown) stored in the memory 134 as well as one or more applications for other instructions stored at the memory 134. The processor 132 may also be configured to execute instructions received via one or more networks. For example, the mobile device 130 may include a number of network interfaces, such as a first network interface 136 and a second network interface 138. In this example, the first network interface 136 may be configured to communicate via a mobile communication network or other wide area wireless network. To illustrate, the first network interface 136 may send data to and receive data from a base station 106 associated with the mobile communication network. The base station 106 may be coupled to the first network 104 to enable communications via devices associated with the network or coupled to the first network 104.

The mobile device 130 may also include a second network interface 138. The second network interface 138 may be configured to enable communications via a WLAN. For example, the WLAN may include a Wi-Fi network (Wi-Fi is a registered trademark of Wi-Fi Alliance Corporation of Austin, Tex.). In other examples, the second network interface 138 may be configured to enable communications via a personal area network (PAN) such as a Bluetooth network (Bluetooth is a registered trademark of Bluetooth SIG, Inc. of Kirkland, Wash.).

The mobile device 130 may also include a display 140. In other examples, the display 140 may be coupled to the mobile device 130 via device interface. In addition, the mobile device 130 may include one or more input devices (not shown). In a particular example, the display 140 may include a touch screen display that enables the mobile device 130 to receive user input via the display 140.

The system 100 may further include a server 152. The server 152 may include an application server. In addition or in the alternative, the server 152 may include a server associated with an application. In some examples the server 152 may be considered associated with the application by virtue of generating data that is provided to the application for use in generating displays, performing calculations, and so forth.

During use, the media device 110 may generate a message 170. The message 170 may include set-up information related to establishing a communication session between the media device 110 and a mobile device, such as the mobile device 130. For example, the set-up information may include information that enables the mobile device 130 to connect to a media device component 124 associated with a particular application, when the media device component 124 is executing at the processor 112 of the media device 110. For example, the media device component 124 may include an application programming interface (API) that the mobile device 130 may connect to. In this specific example, the set-up information may include a selectable link or may be configured to cause the mobile device 130 to display a selectable link 142. A selection of the selectable link 142 may cause the mobile device 130 to execute a mobile device component 144 associated with the particular application.

In some examples, prior to generating the message 170, the media device 110 may generate and display a content catalog at the display device 122. In a particular example, the content catalog may identify available content (e.g., applications) stored by a database 156. The media device 110 may receive a selection of a content item displayed as part of the content catalog. For example, the media device 110 may receive a selection of an application 158 stored at the database 156. The application 158 may correspond to the particular application. The application 158 may include a mobile device component 160 (corresponding to the mobile device component 144) and a media device component 162 (e.g., corresponding to the media device component 124). In response to the selection of the application 158, the media device 110 may retrieve the media device component 162 and store the media device component 162 as the media device component 124 in the memory 114. Further, execution of the media device component 124 may cause the media device 110 to prompt a user (e.g., via the display device 122) to select a mobile device identifier 126, such as a mobile device identifier 126 stored in the memory 114. In some examples, the media device 110 may display a prompt (e.g., via the display device 122) requesting manual entry of a mobile device identifier (e.g., the mobile device identifier 126). The media device 110 may receive the mobile device identifier in response to the prompt. Examples of mobile device identifiers include telephone numbers, international mobile subscriber identity (IMSI) numbers, electronic serial numbers, etc. The mobile device identifier 126 may identify the mobile device 130. Further, the message 170 may be generated (e.g., by the media device component 124) based on the selection of the application 158. To illustrate, the message 170 may indicate or include the mobile device component 160. The mobile device component 160 may be stored in the memory 134 as the mobile device component 144.

Figure 2:
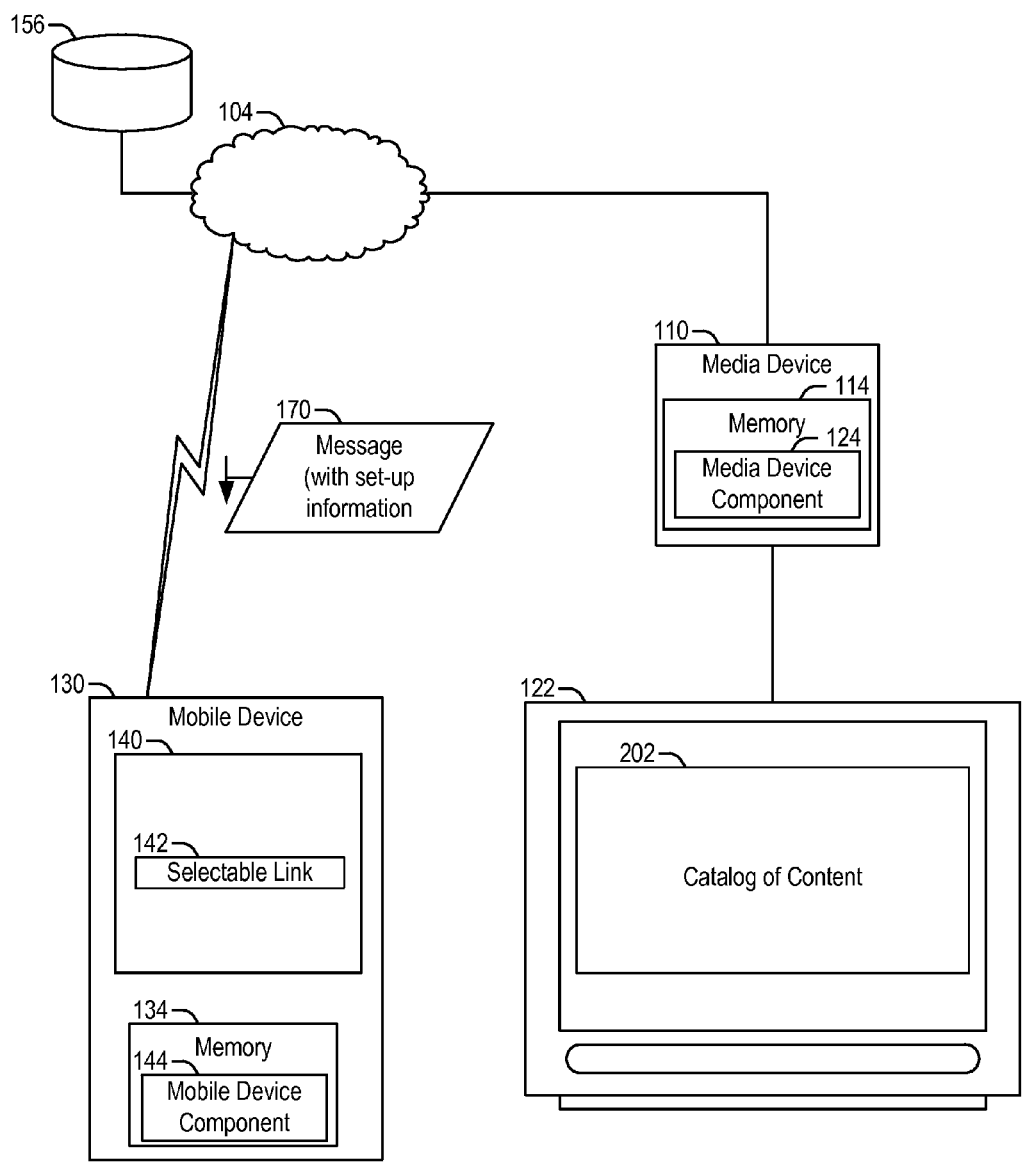
FIG. 2 is a diagram illustrating a particular process for enabling sharing between devices.

As described further with reference to FIG. 2, the message 170 may be sent to the mobile device 130 based on the mobile device identifier 126. The message 170 may be transmitted via the first network 104 and the mobile communication network to the mobile device 130. Based on the message 170, the mobile device 130 may generate display output including the selectable link 142. In response to receiving a selection of the selectable link 142, the mobile device 130 may perform various operations. For example, selection of the selectable link may cause the mobile device 130 to establish a wireless peer-to-peer communication session with the media device 110 via the WLAN 182. In addition or in the alternative, selection of the selectable link may cause the mobile device 130 to execute the mobile device component 144 from the memory 134. The mobile device component 144 may be executable by the processor 132 to establish, or to exchange data (e.g., with the media device 110) to facilitate establishment, of the peer-to-peer communication session.

In some examples, executing the mobile device component 144 may be preceded by the mobile device 130 accessing the database 156. The mobile device 130 may retrieve the mobile device component 160 (e.g., corresponding to the mobile device component 144) from the database 156 and store the mobile device component 160 at the memory 134 as the mobile device component 144. The mobile device 130 may execute the mobile device component 144 at the processor 132. The wireless peer-to-peer communication session may be established between the mobile device component 144 and the media device component 124 in response to execution of the mobile device component 144.

When the mobile device 130 is executing the mobile device component 144 and the media device 110 is executing the corresponding media device component 124, data 180 may be shared between the mobile device 130 and media device 110 via the wireless peer-to-peer communication session over the WLAN 182. For example, the data 180 may include information to generate a display at the display 140, information to generate a display at the display device 122, or both. Additionally, one or both of the mobile device 130 and the media device 110 may communicate with the server 152 or the content source 150 to retrieve content, or to perform particular functions, such as functions associated with a game or communication application (e.g., a video conferencing application). Thus, when the mobile device 130 and the media device 110 are communicating via the wireless peer-to-peer communication session, media output associated with the mobile device 130 and the media device 110 may be coordinated by the server 152, by the content source 150, by the processors 112, 132, or by a combination thereof.

Displays generated at the display 140 and the display device 122 may be the same or may be different. For example, when the mobile device component 144 and the media device component 124 correspond to the application 158, the application 158 may cause different displays to be presented at the display 140 and the display device 122. To illustrate, the display device 122 may present information for consumption by multiple viewers in an area associated with the display device 122, whereas the display 140 may present information intended for consumption by a single user. As a specific example, the media device component 124 and the mobile device component 144 may be associated with a card game. In this specific example, the media device component 124 and the mobile device component 144 may interact to emulate the card game. Thus, the display device 122 may present a view of a card table including, for example, cards that are visible to multiple participants in the game, and the display 140 of the mobile device 130 may present a view of a hand of an individual player including cards that are not visible to other players.

Thus, the system 100 enables the media device 110 to establish a communication session with the mobile device 130 or multiple mobile devices (not shown) to share data 180 associated with the application 158. The media device 110 may have access to the database 156 based on a subscription or limitations imposed on the media device 110 by a content provider. For example, to enable access to the content source 150 associated with the content provider, the media device 110 may be constrained to access the first network 104 via a private access network or via a secured tunnel. Thus, the content provider may limit exposure of the media device 110 to the first network 104 to avoid security concerns associated with the media device 110 accessing the content source 150. Additionally, the content provider may provide the database 156 of applications 158 or may enable the media device 110 to access the database 156 to retrieve approved applications, such as the application 158. In this example, the media device 110 accessing the application 158 via the database 156 may simplify selection of approved applications that are executable by both the media device 110 and the mobile device 130. Further, the system 100 may enable the media device 110 to notify the mobile device 130 (e.g., via the message 170) of a particular application to be executed at the mobile device 130 (e.g., the mobile device component 144) or of a particular mechanism for communication with the media device 110, such as the set-up information associated with the wireless peer-to-peer communication session over the WLAN 182. Thus, the media device 110 facilitates establishing the communication session with the mobile device 130. Further, since the media device component 124 and the mobile device component 144 may include separate instructions and can have separate access to, for example, the server 152, to the content source 150, or to the database 156, displays generated by the media device 110 and the mobile device 130 may be distinct. However, such displays can interact to facilitate particular functions, such as a gaming function or communication function.

FIG. 2 illustrates a particular example of set-up of the initial communications associated with the message 170. In FIG. 2, the media device 110 is used to provide the message 170 to the mobile device 130.

In the example illustrated in FIG. 2, the media device 110 may execute the media device component 124 from the memory 114. Although not specifically illustrated in FIG. 2, the media device 110 may retrieve or access the media device component 124 from the database 156 based on receiving a selection in response to displaying a catalog of content 202 available at the database 156. For example, the display device 122 may be used to display the catalog of content 202 from the database 156. The catalog of content 202 may include applications that are approved for execution at the media device 110. When a user selects a particular application, a media device component, such as the media device component 124, associated with the application may be downloaded to or accessed by the media device 110 for execution at the media device 110. If the media device component 124 has a corresponding mobile device component 144, the media device 110 may prompt a user to send the message 170 to enable the media device 110 to communicate with a mobile device, such as the mobile device 130. For example, execution of the media device component 124 may cause a prompt to be displayed at the display device 122. The prompt may request that a user provide a mobile device identifier (e.g., the mobile device identifier 126) such as a telephone number identifying the particular device with which the media device 110 should share data. Alternately, the memory 114 of the media device 110 may include user settings that include the mobile device identifier (e.g., the mobile device identifier 126).

After determining the mobile device identifier 126, the media device 110 may send the message 170 via the first network 104 to the mobile device 130. The message 170 may include the set-up information that enables the mobile device 130 to establish the peer-to-peer communication session with the media device 110. For example, the set-up information may include an Internet protocol address, a media access control address, an encryption key, a service set identifier, a universally unique identifier associated with a service (e.g., a service offered via Bluetooth), or a combination thereof.

The message 170 may also include information to generate the selectable link 142. The selectable link 142 may be displayed at the mobile device 130. In response to receiving the selection of the selectable link 142, the mobile device 130 may perform various operations. The operations may include initiating and/or establishing communication with the media device 110 and accessing and/or executing the mobile device component 144. For example, if the memory 134 already includes the mobile device component 144 associated with the media device component 124, the mobile device 130 may execute the mobile device component 144 from the memory 134. Alternately, if the message 170 identifies an application for which the mobile device 130 does not have a corresponding mobile device component, the mobile device 130 may use the set-up information to access the database 156 to retrieve and download the mobile device component 144. Accordingly, the example illustrated in FIG. 2 enables the media device 110 to provide information to the mobile device 130 to enable establishment of a wireless peer-to-peer communication session to communicate data associated with a particular application or associated with a media device component 124 of an application and a mobile device component 144 of the application.

Figure 3:
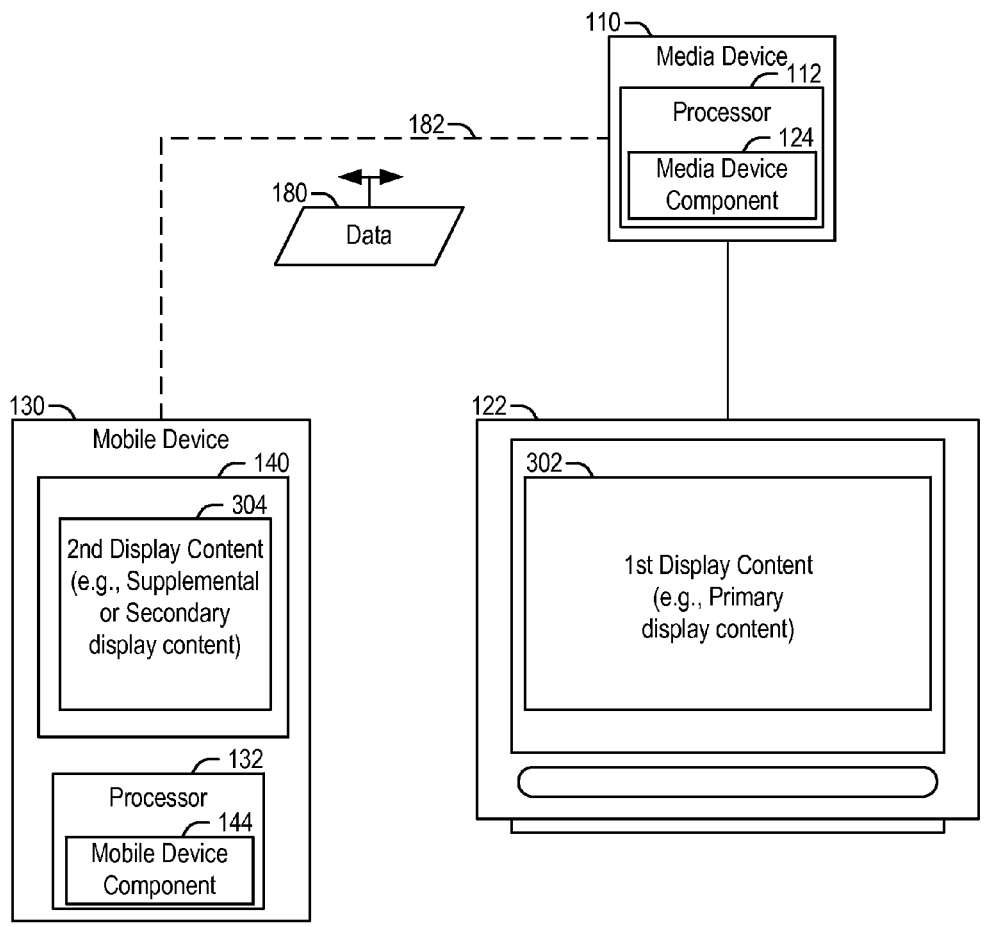
FIG. 3 is a diagram illustrating sharing between devices.

FIG. 3 illustrates a particular example of use of an application (or components of an application) to communicate data between a media device 110 and a mobile device 130. The example in FIG. 3 illustrates communications and operations performed after establishment of the wireless peer-to-peer communication session over the WLAN 182. In the example illustrated in FIG. 3, the processor 112 of the media device 110 is executing the media device component 124, and the processor 132 of the mobile device 130 is executing the mobile device component 144. The mobile device 130 and the media device 110 may communicate data 180 via the wireless peer-to-peer communication session over the WLAN 182. Additionally, although not shown in FIG. 3, the media device 110, the mobile device 130, or both, may communicate via a WAN with one or more servers, such as the server 152 of FIG. 1, and/or one or more content sources, such as the content source 150 at FIG. 1, etc.

The data 180 may include data to generate a display at one or both of the media device 110 and the mobile device 130. For example, the media device 110 may generate a first display content 302. In this example, the first display content 302 may include primary display content such as a wide area view of particular media content, a view of multiple parties or participants in a game, a general game view, such as cards or other tokens that are visible to multiple players in the game, etc. Additionally, the mobile device 130 may generate a second display content 304. The second display content 304 may include supplemental or secondary content. For example the supplemental or secondary content may include a narrow view associated with the media content displayed at the media device 110, an alternate view associated with the content displayed at the media device 110, a single player view or single team view associated with a game or other similar application, and so forth. In one example, the media content may correspond to educational content. To illustrate, the first display content 302 may correspond to a teacher's view of a textbook or quiz that may include answers or additional notes while the second display content 304 may correspond to a student view of the textbook or quiz that lacks the answers or the additional notes. Although in FIG. 3 the primary content display is shown at the display device 122, and the secondary or supplemental content display is shown at the display 140 of the mobile device 130, in other examples, the primary display content may be at the mobile device 130 and the secondary or supplemental content at the display device 122. Additionally, although FIGS. 1-3 illustrate a single media device (e.g., the media device 110) and a single mobile device (e.g., the mobile device 130), in other examples, the system may include multiple mobile devices communicating with a single media device, multiple media devices communicating with a single mobile device, or multiple mobile devices communicating with multiple media devices.

Figure 4:
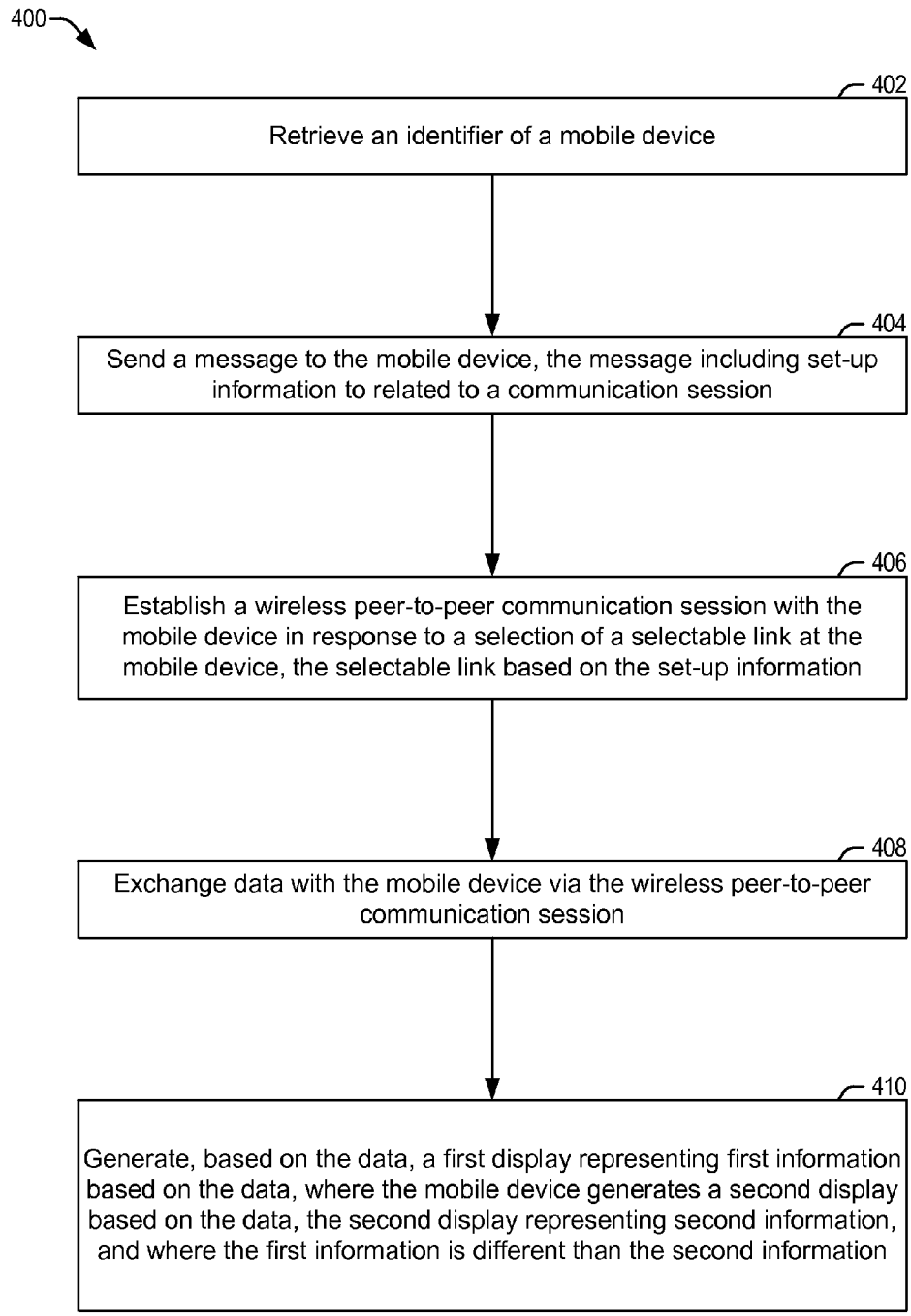
FIG. 4 is a flowchart illustrating a method of enabling sharing between devices.

FIG. 4 illustrates a particular example of sharing data between a mobile device and a media device. For example, the method 400 may be performed by a media device (e.g., the media device 110) to establish an exchange of data with a particular mobile device (e.g., the mobile device 130). The method 400 includes, at 402, retrieving a device identifier of a mobile device. For example, the media device 110 of FIG. 1 may retrieve the mobile device identifier 126 from the memory 114 of the media device 110. Alternately, the media device 110 may retrieve the mobile device identifier 126 by providing a prompt via the display device 122 to request that a user input the mobile device identifier 126. In a particular example, the mobile device identifier 126 may include a network address of the mobile device 130 or a telephone number of the mobile device 130.

The method 400 also includes, at 404, sending a message to the mobile device. The message may include set-up information related to a communication session. For example, the media device 110 may send the message 170 to the mobile device 130. In a particular example, the message 170 may include a short messaging service message or another message transmitted via a mobile communication network or other WAN. As explained above, the message 170 may include set-up information. The set-up information may include information to establish a wireless peer-to-peer communication session between the mobile device 130 and the media device 110. Additionally or in the alternative, the set-up information may include information used to access to an API of a particular application of the media device 110. For example, the set-up information may identify the mobile device component 144. In a specific example as illustrated in FIG. 4, the wireless peer-to-peer communication session may be established using web real time communications (web RTC data channel).

The method 400 also includes at 406, establishing a wireless peer-to-peer communication session with the mobile device in response to a selection of a selectable link at the mobile device. The selectable link may be based on the set-up information provided via the message. For example, the mobile device 130 may generate a display including the selectable link 142 in response to the message 170. When a user selects the selectable link 142, the mobile device 130 may provide information to the media device 110 indicating selection of the link. Alternately, the mobile device 130 may establish or may initiate establishment of the wireless peer-to-peer session via the WLAN 182. In this example, the set-up information may include information to enable communication between the second network interface 138 of the mobile device 130 and the second network interface 118 of the media device 110.

The method 400 also includes, at 408, exchanging data with the mobile device via the wireless peer-to-peer communication session. For example, the mobile device 130 and the media device 110 may exchange the data 180 via the wireless peer-to-peer communication session over the WLAN 182. The method 400 may also include, at 410, generating a first display based on the data. The first display may represent first information based on the data. The mobile device may generate a second display based on the data. The second display may represent second information, and the second and first information may be different. For example, as previously described, the media device 110 may generate the first display content 302 in FIG. 3 based on the data 180. Additionally, the mobile device 130 may generate the second display content 304 based on the data 180. The second display content 304 may be different than the first display content 302.

Thus, the method 400 enables the media device 110 to establish a communication session with the mobile device 130 in order to share the data 180 to enable display of multiple types of displays to a user. Such displays may include the first display content 302 displayed at the display device 122 and the second display content 304 displayed at the mobile device 130.

Figure 5:
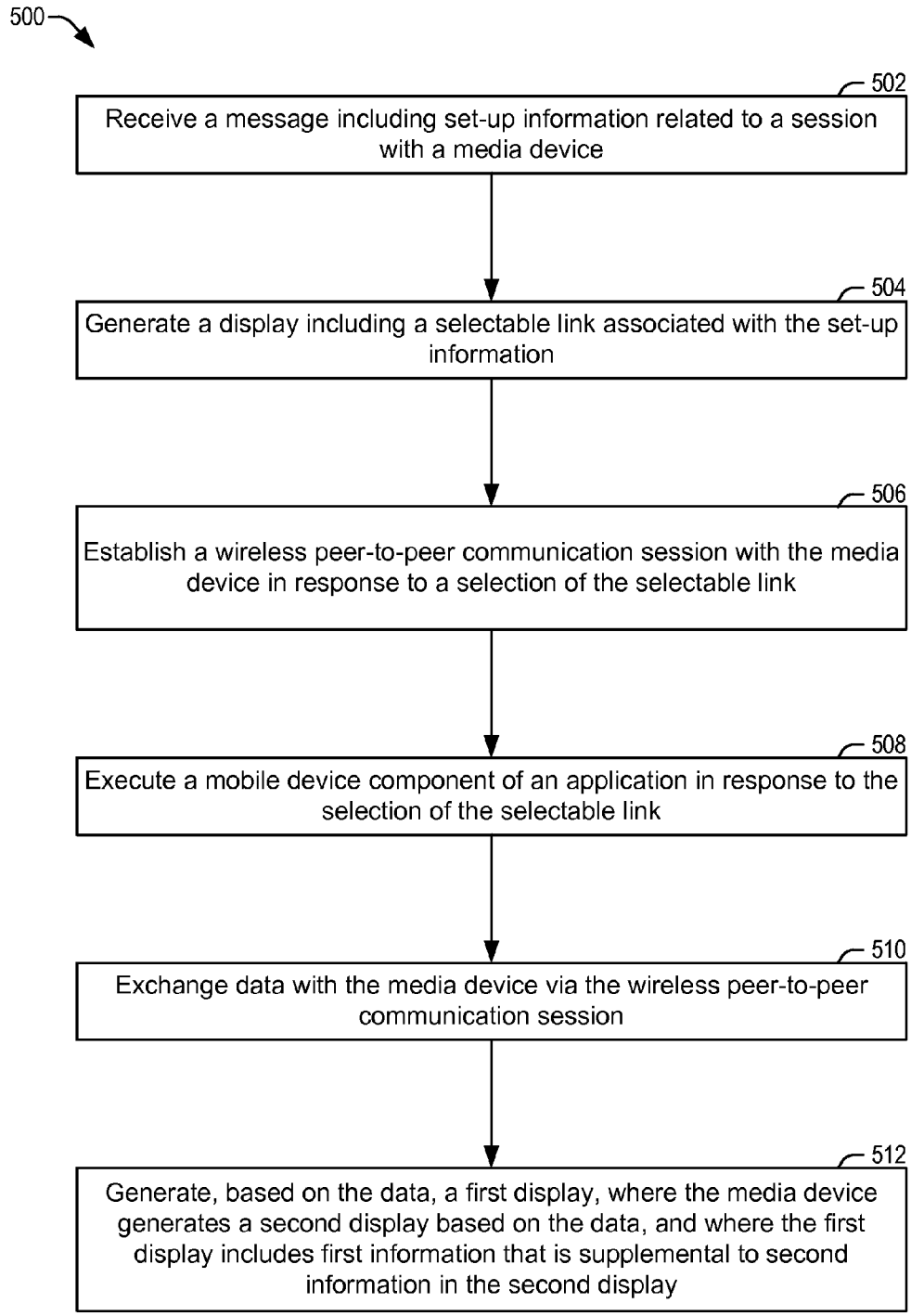
FIG. 5 is a flowchart illustrating another method of enabling sharing between devices.

FIG. 5 illustrates a particular example of sharing data between a mobile device and a media device. For example, the method 500 may be performed by a mobile device (e.g., the mobile device 130) to establish an exchange of data with a particular media device (e.g., the media device 110). The method 500 includes receiving a message including set-up information related to a session with a media device. For example, the mobile device 130 may receive the message 170 from the media device 110. The message 170 may include set-up information for establishing a peer-to-peer communication session over the WLAN 182. For example, the set-up information may include information to access an API of a particular application of the media device 110. For example, the set-up information may identify the mobile device component 144.

The method 500 further includes generating a display including a selectable link associated with the set-up information, at 504. For example, the mobile device 130 may present the selectable link 142 via the display 140 based on the set-up information included in the message 170.

The method 500 further includes establishing a peer-to-peer communication session with the media device in response to a selection of the selectable link, at 506. For example, in response to receiving a selection of the selectable link 142, the mobile device 130 may establish the peer-to-peer communication session over the WLAN 182 with the media device 110. The mobile device 130 may establish the peer-to-peer communication session by notifying the media device 110 (via the first network 104) of the selection and providing the media device 130 information to connect to the mobile device 130. Alternatively, the mobile device 130 may contact the media device 110 via the WLAN to set-up the peer-to-peer communication session.

The method 500 further includes executing a mobile device component of an application in response to the selection of the selectable link, at 508. For example, the mobile device 130 may execute the mobile device component 144 stored in the memory 134 in response to receiving a selection of the selectable link 142. In some examples, executing the mobile device component 144 may be preceded by querying the database 156 for the mobile device component 160 and storing the mobile device component 160 in the memory 134 as the mobile device component 144. The mobile device component 144 may be identified in the message 170, or the media device 110 may identify the mobile device component 144 after the peer-to-peer communication session has been established. In some examples, the peer-to-peer communication session is between the mobile device component 144 and the media device component 124. Thus, the sequence of the method 500 may be different than illustrated.

The method 500 further includes exchanging data with the media device via the wireless peer-to-peer communication session, at 510. For example, the mobile device 130 may exchange the data 180 with the media device 110 via the peer-to-peer communication session over the WLAN 182. In some examples, the data 180 may be exchanged between the mobile device component 144 and the media device component 124.

The method 500 further includes generating, based on the data, a first display, where the media device generates a second display based on the data, and where the first display includes information that is supplemental to second information in the second display, at 512. For example, the mobile device component 144 executing at the mobile device 130 may generate the second display content 304 based on the data 180. The media device component 124 executing at the media device 110 may generate the first display content 302 based on the data 180. In some examples, the first display content 302 corresponds to a primary display of media content, and the second display content 304 corresponds to a supplemental display of the media content. For example, the first display content 302 may show cards in a card game that are visible to all players while the second display content 304 may show cards visible only to a particular player. In another example, the first display content 302 may show content visible to all players in a role playing game while the second display content 304 may show content visible only to a game master. It should be noted that in some examples, the mobile device 130 display primary content based on the data 180 and the media device 110 may display supplemental content based on the data 180.

Thus, the method 500 enables the mobile device 130 to establish a communication session with the media device 110 in order to share the data 180 to enable display of multiple types of displays to a user. Such displays may include the first display content 302 displayed at the display device 122 and the second display content 304 displayed at the mobile device 130.

Figure 6:
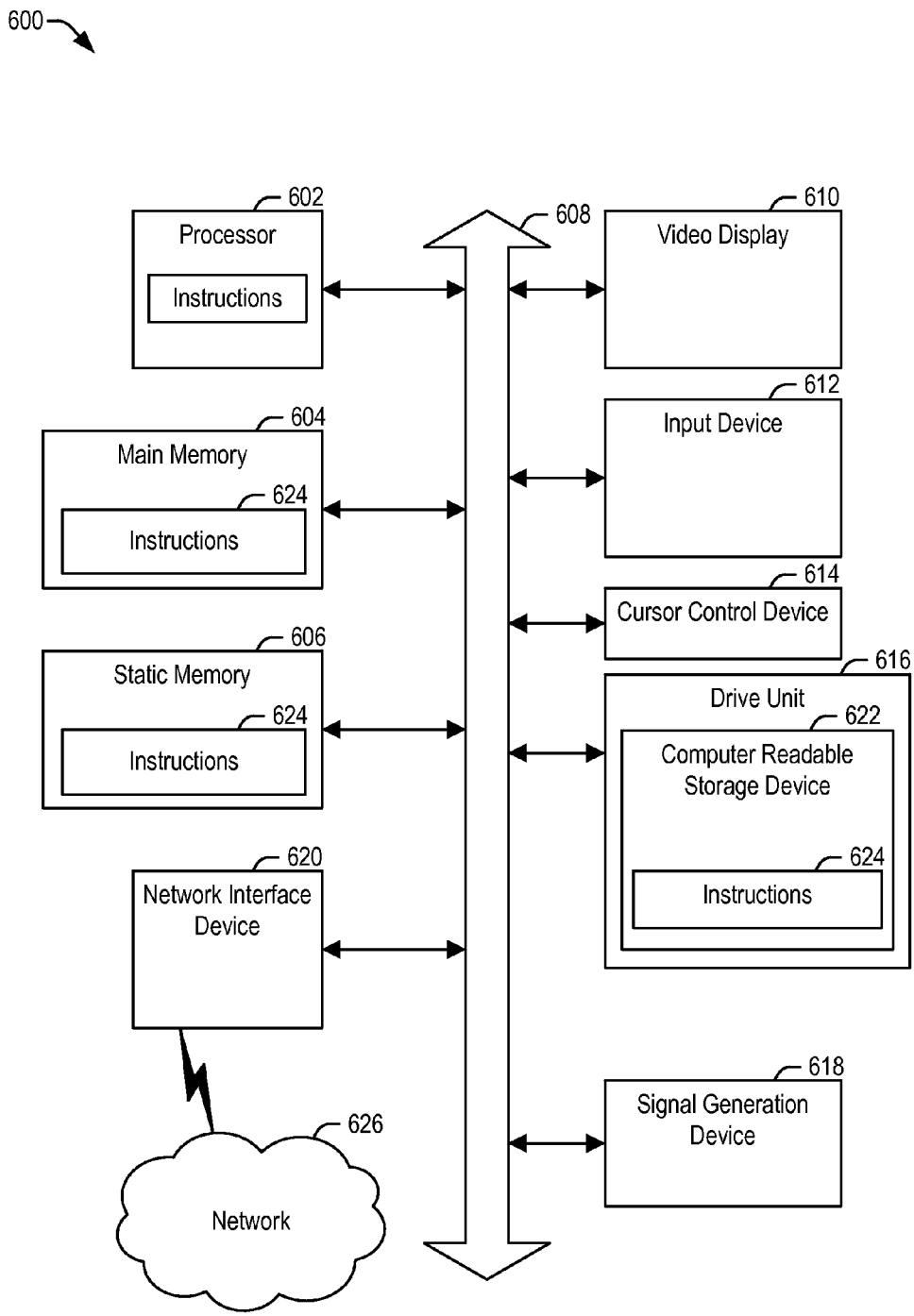
FIG. 6 is a block diagram of an example of a computer system that may enable sharing between devices.

FIG. 6 is a block diagram of an example of a computer system 600, such as a user device or a server, of the system 100 of FIG. 1. For example, the computer system 600 of FIG. 6 may include, be included within, or correspond to the media device 110 or the mobile device 130 FIG. 1. The computer system 600 includes a set of instructions 624 or multiple sets of instructions that can be executed to cause the computer system 600 to perform any one or more of the methods or computer-based functions disclosed herein. To illustrate, in an implementation in which the computer system 600 corresponds to the media device 110, the instructions 624 may cause the computer system 600 to operate as the media device 110, as described herein. In an implementation in which the computer system 600 corresponds to the mobile device 130, the instructions 624 may cause the system to operate as the mobile device 130, as described herein.

The computer system 600 or may be connected, e.g., using a network 626, to other computer systems or peripheral devices. In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular example, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602 (or multiple processors), e.g., a central processing unit (CPU), a graphics processing unit (GPU), or both. Moreover, the computer system 600 may include a main memory 604 and a static memory 606, which can communicate with each other via a bus 608.

The computer system 600 may further include a video display unit 610, such as a liquid crystal display (LCD), a light emitting diode (LED) display, a touch screen display, a flat panel display, or a solid state display. Additionally, the computer system 600 may include an input device 612, such as a remote control device or a keyboard, and a cursor control device 614, such as a mouse. In some implementations, the input device 612 and the cursor control device 614 may be integrated into a single device, such as a capacitive touch screen input device. The computer system 600 may also include a signal generation device 618, such as a speaker, and a network interface device 620. Some computer systems 600 may not include an input device (e.g., a server may not include an input device).

In the particular example illustrated in FIG. 6, the computer system 600 includes a drive unit 616 that includes computer-readable storage 622 (i.e., a computer-readable storage device) in which one or more sets of instructions 624, e.g. software, can be embedded. The computer-readable storage 622 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 624 may be executable to perform operations of one or more of the methods or logic as described herein. For example, the instructions 624 may be executable by the processor 602 to perform one or more functions or methods described herein, such as the method 400 of FIG. 4 or the method 500 of FIG. 5. The instructions 624 may reside completely, or at least partially, within the main memory 604, the static memory 606, and/or within the processor 602 during execution by the computer system 600.

In an alternative implementation, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes a computer-readable storage device 622 that stores instructions 624, so that a device connected to the network 628 may communicate voice, video or data over the network 628. While the computer-readable storage device 622 is shown to be a single device, the computer-readable storage device 622 may include a single device or multiple devices, such as a centralized or distributed database, and/or associated caches and servers that store one or more sets of instructions. The computer-readable storage device 622 is capable of storing a set of instructions for execution by a processor to cause a computer system to perform any one or more of the methods or operations disclosed herein.

In a particular non-limiting, exemplary embodiment, the computer-readable storage device 622 may include a solid-state memory, such as embedded memory (or a memory card or other package that houses one or more non-volatile read-only memories). Further, the computer-readable storage device 622 may be a random access memory or other volatile re-writable memory. Additionally, the computer-readable storage device 622 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 600 in selected embodiments.

The illustrations of the examples, particular implementations, and embodiments described herein are intended to provide a general understanding of the structure of the various embodiments. The illustrations are not intended to serve as a complete description of all of the elements and features of apparatus and systems that utilize the structures or methods described herein. Many other examples, implementations and/or embodiments may be apparent to those of skill in the art upon reviewing the disclosure. Other examples, implementations and/or embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific examples, implementations and embodiments have been illustrated and described herein, it should be appreciated that any subsequent arrangement designed to achieve the same or similar purpose may be substituted for the specific embodiments shown. This disclosure is intended to cover any and all subsequent adaptations or variations of the disclosed subject matter.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations," this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A media device comprising:
a processor; and
a memory accessible to the processor, the memory storing instructions that are executable by the processor to cause the processor to perform operations comprising:
executing a media device program of an application;
causing a message to be sent to a mobile device in response to execution of the media device program, the message including set-up information related to a communication session for the application;
establishing a wireless peer-to-peer communication session with the mobile device in response to a selection of a selectable link at the mobile device, the selectable link based on the set-up information;
exchanging data with the mobile device via the wireless peer-to-peer communication session; and
generating, based on the data, a first display representing first information based on the data, wherein the mobile device generates a second display based on the data, the second display representing second information, and wherein the first information is different than the second information.

2. The media device of claim 1, wherein the set-up information enables the mobile device to connect to an application programming interface associated with the application.

3. The media device of claim 2, wherein the selection of the selectable link at the mobile device causes the mobile device to execute a mobile device program of the application.

4. The media device of claim 1, wherein the operations further comprise receiving user input of an identifier associated with the mobile device prior to causing the message to be sent to the mobile device.

5. The media device of claim 1, wherein the operations further comprise generating a display identifying a catalog of content, wherein the message is generated based on a content item selected from the catalog of content.

6. The media device of claim 1, wherein the operations further comprise retrieving an identifier of the mobile device and wherein the message is sent to the mobile device based on the identifier.

7. The media device of claim 6, wherein the operations further comprise generating a display including a prompt requesting the identifier of the mobile device and receiving the identifier of the mobile device responsive to the prompt.

8. The media device of claim 6, wherein the identifier of the mobile device includes a telephone number.

9. The media device of claim 6, wherein the identifier of the mobile device is retrieved from the memory.

10. The media device of claim 1, wherein the wireless peer-to-peer communication session is established using a Web Real-Time Communication data channel.

11. The media device of claim 1, wherein the second information is supplemental to the first information.

12. The media device of claim 1, wherein the message further comprises information to identify a mobile device program that is executable at the mobile device to establish the wireless peer-to-peer communication session or to exchange data via the wireless peer-to-peer communication session.

13. A mobile device comprising:
a processor; and
a memory accessible to the processor, the memory storing instructions that are executable by the processor to cause the processor to perform operations comprising:
receiving, from a media device running a media device program of an application, a message including set-up information related to establishing a session for the application with the media device;
generating a display including a selectable link associated with the set-up information;

establishing a wireless peer-to-peer communication session with the media device in response to a selection of the selectable link;

exchanging data with the media device via the wireless peer-to-peer communication session; and generating, based on the data, a first display, wherein the media device generates a second display based on the data, and wherein the first display includes first information that is supplemental to second information in the second display.

14. The mobile device of claim 13, wherein establishing the wireless peer-to-peer communication session includes communicating with an application programming interface associated with a second application executing at the processor.

15. The mobile device of claim 13, wherein the operations further comprise executing a mobile device program of a second application in response to the selection of the selectable link.

16. The mobile device of claim 15, wherein the message further includes information to identify the mobile device program.

17. The mobile device of claim 15, wherein the data is exchanged with the media device via the mobile device program.

18. The mobile device of claim 13, wherein the first information includes a narrow view associated with media content displayed at the media device, an alternate view associated with the media content displayed at the media device, a single player view associated with a game, a single team view associated with the game, or a combination thereof.

19. A method comprising:

sending a message to a mobile device via a first network from a media device responsive to execution by the media device of a media device program of an application, the message including set-up information related to a communication session for the application;

establishing a wireless peer-to-peer communication session with the mobile device via a second network in response to a selection of a selectable link at the mobile device, the selectable link based on the set-up information;

exchanging data with the mobile device via the wireless peer-to-peer communication session; and generating, based on the data, a first display representing first information based on the data, wherein the mobile device generates a second display based on the data, the second display representing second information, and wherein the first information is different than the second information.

20. The method of claim 19, wherein the first network includes a wide area wireless network and the second network includes a local area wireless network.

* * * * *